(12) United States Patent
Di Mattia et al.

(10) Patent No.: US 8,584,159 B2
(45) Date of Patent: Nov. 12, 2013

(54) CONVERTING STANDARD DEFINITION TELEVISION ADVERTISEMENTS TO HIGH DEFINITION FORMAT

(75) Inventors: James Di Mattia, Churchville, MD (US); Dale E. Veeneman, Southborough, MA (US); Lily Chen, Fort Lee, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/292,238

(22) Filed: Nov. 9, 2011

(65) Prior Publication Data

US 2012/0254913 A1    Oct. 4, 2012

Related U.S. Application Data

(60) Provisional application No. 61/468,973, filed on Mar. 29, 2011.

(51) Int. Cl.
*H04N 7/10* (2006.01)
*H04N 7/025* (2006.01)

(52) U.S. Cl.
USPC ............................................. 725/32; 725/34

(58) Field of Classification Search
USPC ...................................................... 725/32, 34
See application file for complete search history.

(56) References Cited

U.S. PATENT DOCUMENTS

| | | | |
|---|---|---|---|
| 2002/0056093 A1* | 5/2002 | Kunkel et al. | 725/35 |
| 2003/0188308 A1* | 10/2003 | Kizuka | 725/32 |
| 2005/0028193 A1* | 2/2005 | Candelore et al. | 725/32 |
| 2006/0033838 A1* | 2/2006 | Choi | 348/441 |
| 2007/0192820 A1* | 8/2007 | Watanabe et al. | 725/134 |
| 2011/0264530 A1* | 10/2011 | Santangelo et al. | 705/14.64 |

* cited by examiner

*Primary Examiner* — Robert Hance

(57) ABSTRACT

A device receives a request for an advertisement from a set-top box (STB) displaying television content in a high definition format, and provides, to the STB, the advertisement in a standard definition format, where the high definition format includes a resolution higher than a resolution of the standard definition format. The device also determines whether the STB converts the advertisement from the standard definition format to the high definition format. When the STB fails to convert the advertisement from the standard definition format to the high definition format, the device generates a first error code and instructs the STB to continue to display the television content, without interruption, in the high definition format.

20 Claims, 6 Drawing Sheets

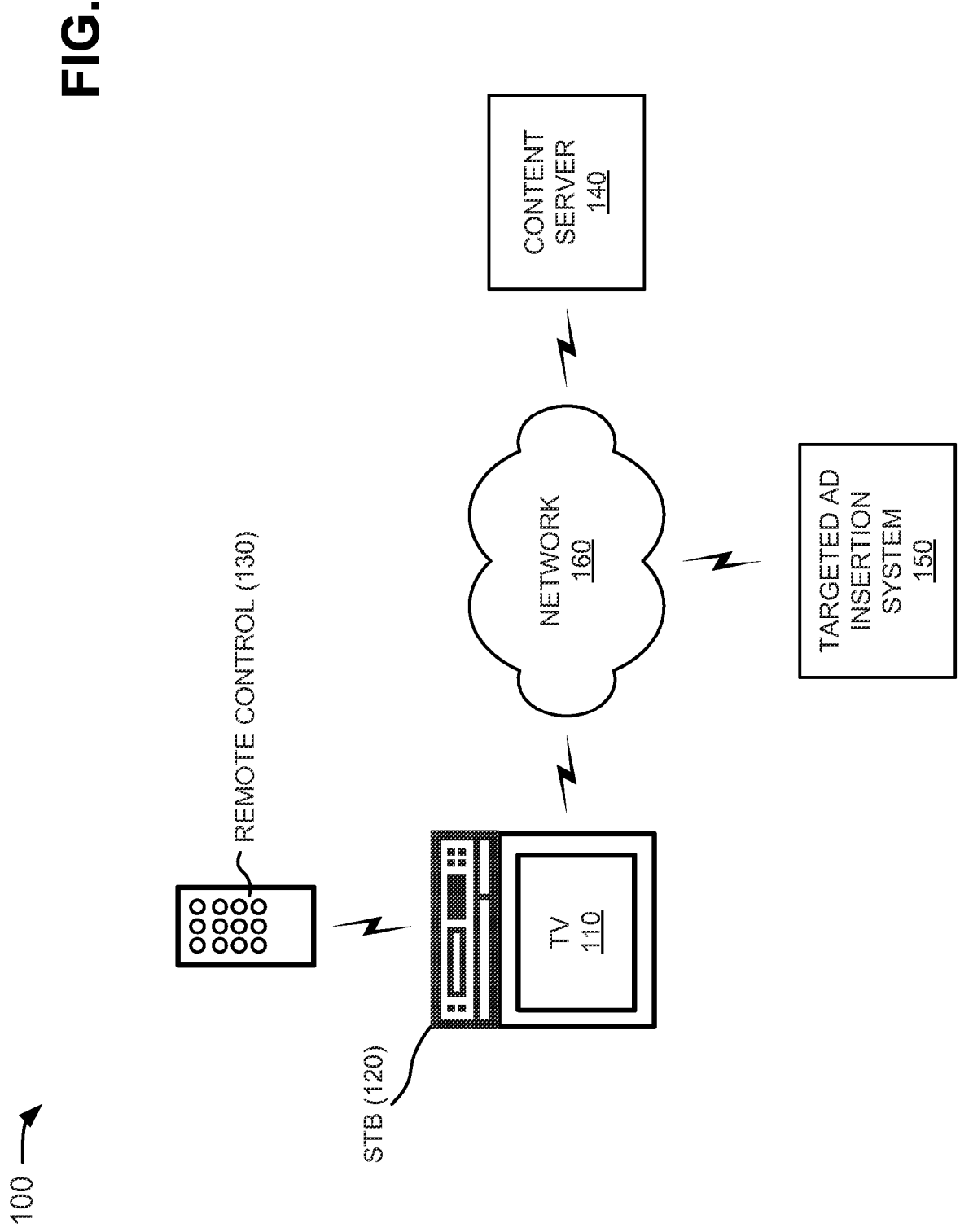

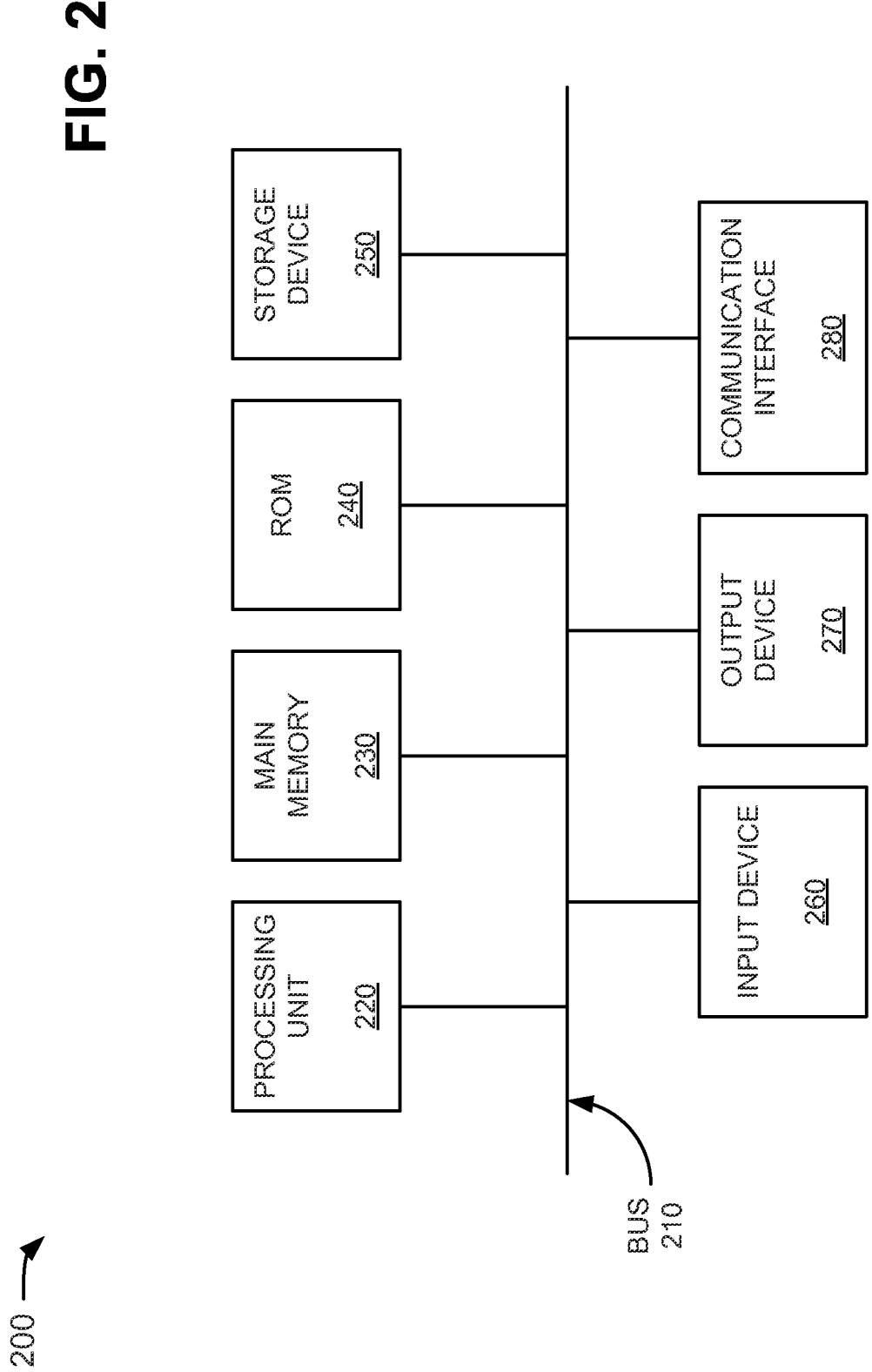

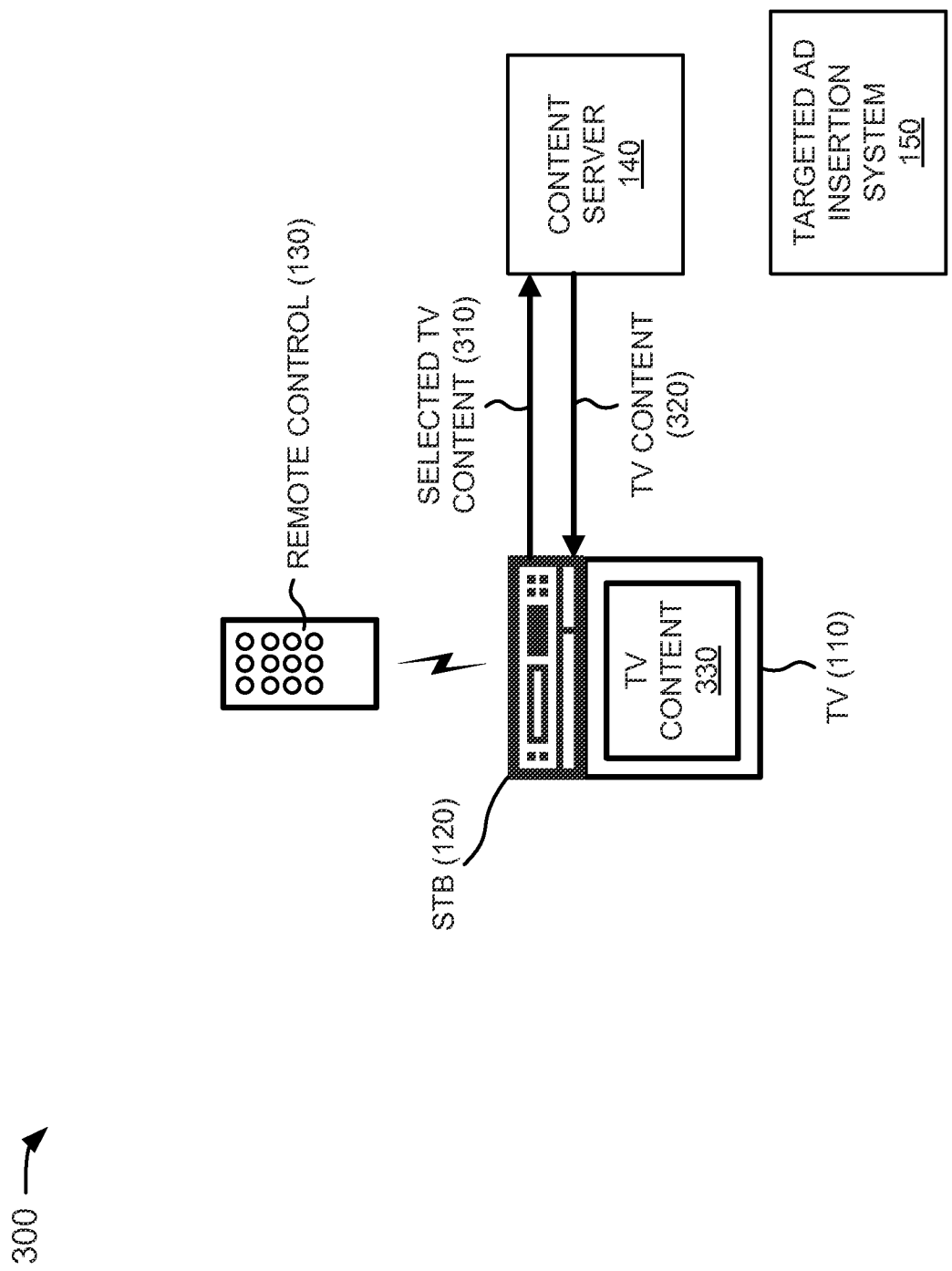

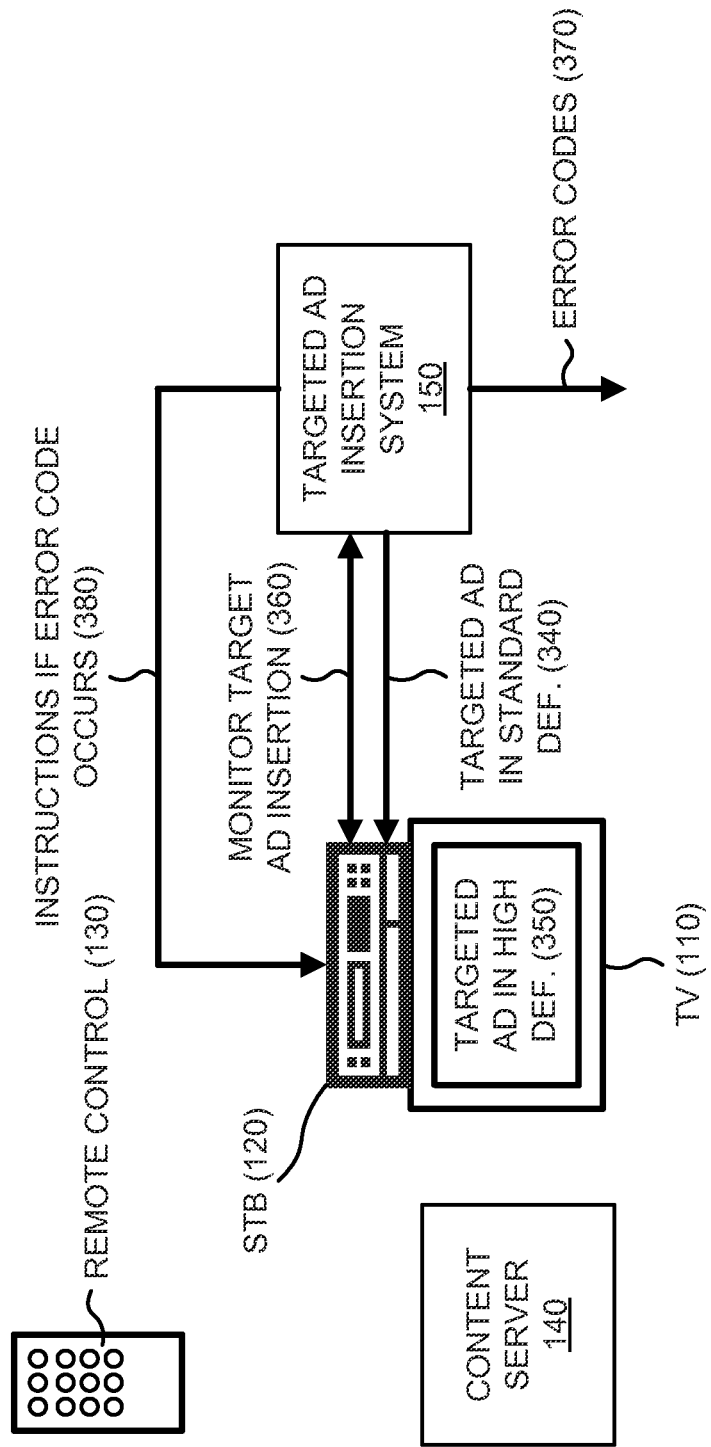

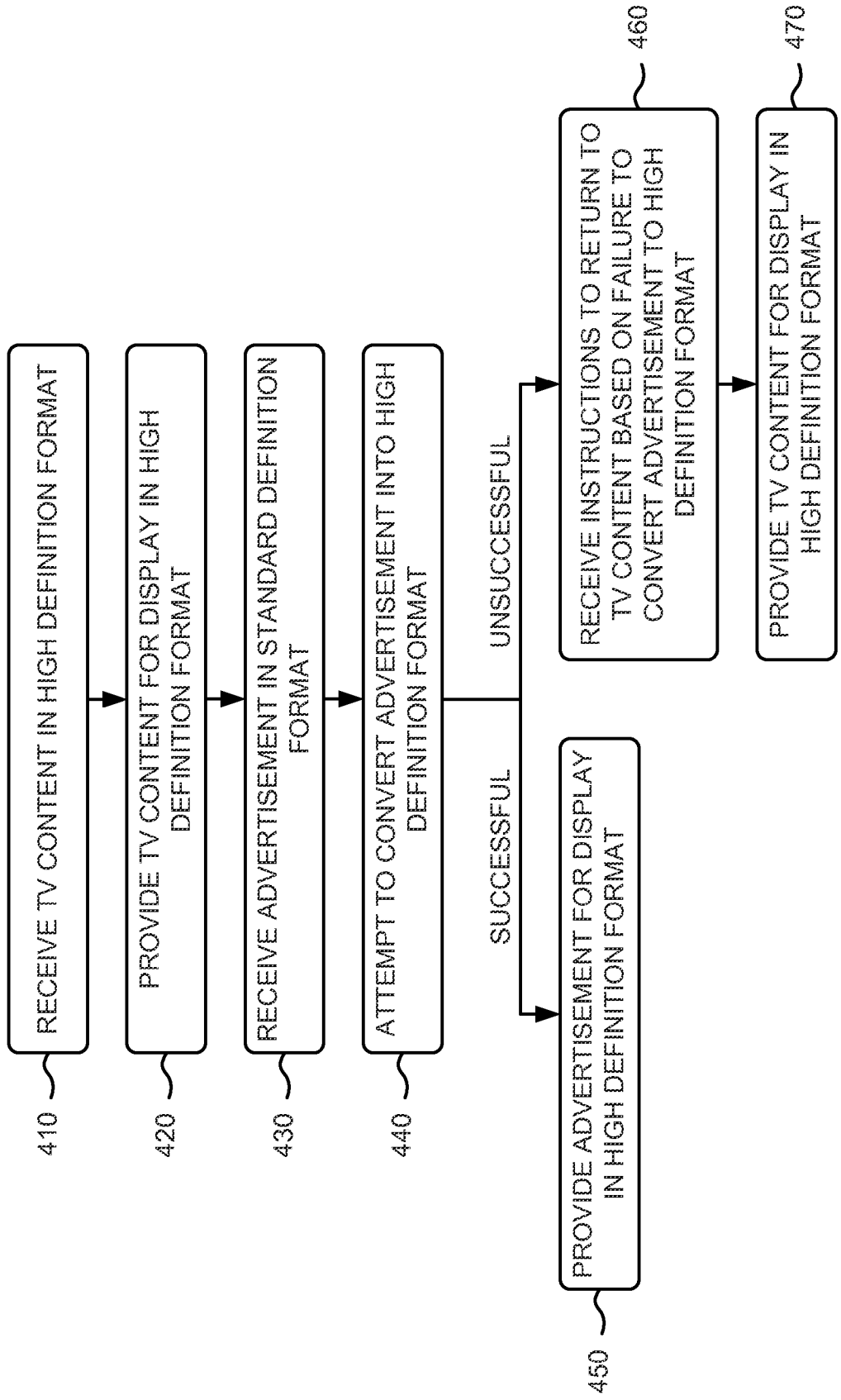

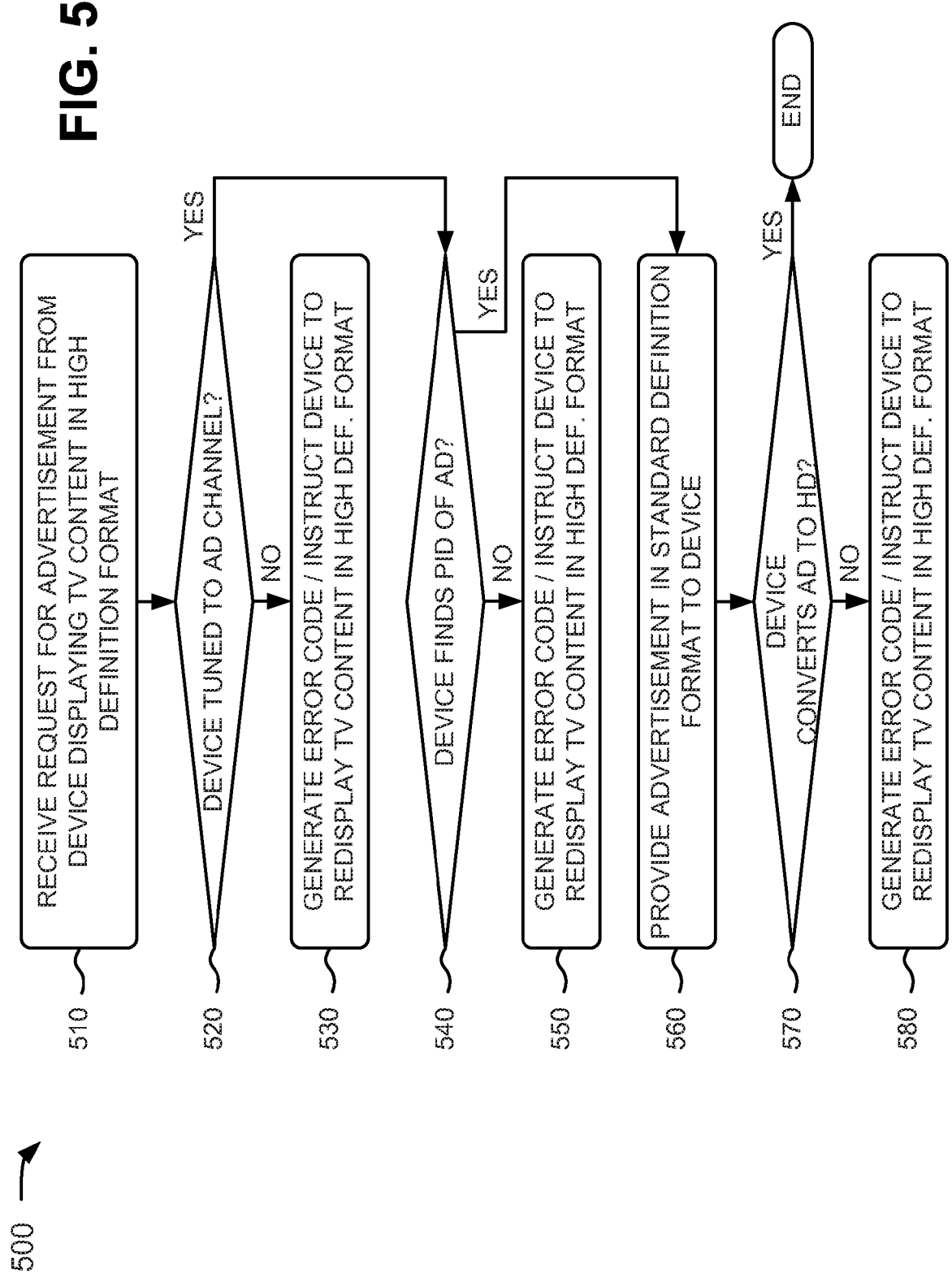

CONVERTING STANDARD DEFINITION TELEVISION ADVERTISEMENTS TO HIGH DEFINITION FORMAT

RELATED APPLICATION

This application claims priority under 35 U.S.C. §119 based on U.S. Provisional Patent Application No. 61/468,973, filed Mar. 29, 2011, the disclosure of which is incorporated by reference herein in its entirety.

BACKGROUND

Many television users (or viewers) regularly watch a number of television (TV) channels that display TV content, such as TV shows, pay-per-view (PPV) content, video-on-demand (VOD) content, etc. Some TV content may be provided to viewers in a standard definition format, while other TV content may be provided to viewers in a high definition format having resolution substantially higher than a resolution of the standard definition format. One or more commercials or advertisements (ads) may be displayed to the user during the airing of the TV content.

Targeted ad insertion systems have been developed that send advertisement video streams on independent advertisement channels at a time when a content channel (e.g., a television channel) enters an advertisement break. A set-top box (STB), provided in a customer's premises, may be instructed to change channels to the advertisement channel carrying the advertisement relevant to the viewer. However, due to bandwidth constraints, the advertisement may be provided to the STB in a standard definition format. Thus, if the viewer is watching TV content in a high definition format, the STB will have to rescale a standard definition picture displayed on a television in order to properly display the advertisement.

Targeted ad insertion systems may experience several issues that may prevent an advertisement from been displayed on the television by the STB. For example, targeted ad insertion systems may use ad channels that require bandwidth to be set aside for carrying advertisement video streams when any content channel enters an advertisement break. The greater the number of content channels using the ad channels for ad insertion, the greater the likelihood that such ad channels may not be available when needed by a specific content channel for ad insertion.

BRIEF DESCRIPTION OF THE DRAWINGS

FIG. 1 is a diagram of an example network in which systems and/or methods described herein may be implemented;

FIG. 2 is a diagram of example components of one or more devices of the network depicted in FIG. 1;

FIGS. 3A and 3B are diagrams of example interactions between components of an example portion of the network illustrated in FIG. 1;

FIG. 4 is a flow chart of an example process for upscaling standard definition television advertisements according to implementations described herein; and FIG. 5 is a flow chart of an example process for monitoring provision of upscaled standard definition television advertisements according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a television advertisement, provided in standard definition (SD) format (referred to herein as "standard definition advertisement"), to be utilized during display of high definition (HD) TV content without having to rescale a picture displayed on a television. The systems and/or methods may insert a standard definition advertisement into high definition TV content when a STB is instructed to tune to the advertisement. In one example, standard definition and high definition networks may insert separate advertisements, on separate ad channels, each according to separate schedules. The STB, tuned to the high definition TV content, may upscale (or convert) the standard definition advertisement to a high definition format so that the advertisement may be displayed on the television without the STB having to rescale the picture displayed on the television.

In one example implementation, the standard definition advertisement may be provided to the STB via a targeted ad insertion system. The targeted ad insertion system may monitor the STB to determine whether the STB is properly providing the advertisement. For example, the targeted ad insertion system may determine whether the STB is tuned to an appropriate ad channel for retrieving the advertisement; may determine whether the STB is able to locate a program identifier (PID) for the advertisement; may determine whether the STB upscales the standard definition advertisement to a high definition format; etc. If the targeted ad insertion system determines that the STB is not properly providing the advertisement, the targeted ad insertion system may generate unique error codes (e.g., dependent upon what the STB failed to perform) and may instruct the STB to return to the previously viewed TV content.

As used herein, the terms "customer," "viewer," and/or "user" may be used interchangeably. Also, the terms "customer," "viewer," and/or "user" are intended to be broadly interpreted to include a STB, a remote control, and/or a television or a user of a STB, remote control, and/or television.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a television (TV) 110, a STB 120, a remote control 130, a content server 140, a targeted ad insertion system 150, and a network 160. Devices/networks of network 100 may interconnect via wired and/or wireless connections. A single television 110, STB 120, remote control 130, content server 140, targeted ad insertion system 150, and network 160 have been illustrated in FIG. 1 for simplicity. In practice, there may be more televisions 110, STBs 120, remote controls 130, content servers 140, targeted ad insertion systems 150, and/or networks 150.

Television 110 may include a television monitor that is capable of displaying television programming, content provided by STB 120, and/or content provided by other devices (e.g., a digital video disk (DVD) player, a video camera, etc., not shown) connected to television 110.

STB 120 may include a device that receives television content or programming (e.g., from content server 140), and provides the television programming to television 110 or another device. STB 120 may allow a user to alter the television programming provided to television 110 based on a signal (e.g., a channel up or channel down signal) from remote control 130. STB 120 may record video in a digital format to a disk drive or other memory medium within STB 120. In one example implementation, STB 120 may be incorporated directly within television 110 and/or may include a digital video recorder (DVR). Alternatively, or additionally, television 110 and STB 120 may be replaced with a computing device, such as a personal computer, a laptop computer, a tablet computer, etc. STB 120 may receive advertisement channels from targeted ad insertion system 150, and may provide the advertisement channels to television 110 or another device during an advertisement break.

Remote control 130 may include a device that allows a user to control television programming and/or content displayed on television 110 via interaction with television 110 and/or STB 120. For example, remote control 130 may alter television programming provided to television 110 via user selection of a channel up or channel down button of remote control 130. Further details of remote control 130 are provided below in connection with, for example, FIGS. 3A and 3B.

Content server 140 may include one or more server devices, or other types of computation or communication devices, that gather, process, search, and/or provide information in a manner described herein. In one example implementation, content server 140 may include a computer system, an application, a cable head-end, and/or a broadcasting device capable of providing content (e.g., VOD content, high definition (HD)-VOD content, TV programming, movies, on-demand services, live television, etc.), commercials, advertisements, instructions, and/or other information to STB 120. Further details of content server 140 are provided below.

Targeted ad insertion system 150 may include one or more server devices, or other types of computation or communication devices, that gather, process, search, and/or provide information in a manner described herein. In one example implementation, targeted ad insertion system 150 may provide targeted advertisements in standard definition format to STB 120 (e.g., for display on television 110). Targeted ad insertion system 150 may monitor STB 120 to determine whether STB 120 is properly providing an advertisement. For example, targeted ad insertion system 150 may determine whether STB 120 is tuned to an appropriate ad channel for retrieving the advertisement; may determine whether STB 120 is able to locate a PID for the advertisement; may determine whether STB 120 upscales the standard definition advertisement to a high definition format; etc. If targeted ad insertion system 150 determines that STB 120 is not properly providing the advertisement, targeted ad insertion system 150 generate unique error codes (e.g., dependent upon what STB 120 failed to perform) and may instruct STB 120 to return to the previously viewed TV content. Further details of targeted ad insertion system 150 are provided below.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example devices/networks of network 100, in other implementations, network 100 may contain fewer devices/networks, different devices/networks, differently arranged devices/networks, or additional devices/networks than those depicted in FIG. 1. Alternatively, or additionally, one or more devices/networks of network 100 may perform one or more other tasks described as being performed by one or more other devices/networks of network 100.

FIG. 2 is an example diagram of a device 200 that may correspond to one or more devices of network 100. In one example implementation, one or more of the devices of network 100 may include one or more devices 200 or one or more components of device 200. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. In one example, processing unit 220 may be implemented as or include one or more ASICs, FPGAs, or the like. Main memory 230 may include one or RAMs or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits a user to input information to device 200, such as a keyboard, a mouse, a pen, a microphone, voice recognition and/or biometric mechanisms, a remote control, a touch screen, etc. Output device 270 may include a mechanism that outputs information to the user, including a display, a printer, a speaker, etc. Communication interface 280 may include any transceiver-like mechanism that enables device 200 to communicate with other devices, networks, and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

FIGS. 3A and 3B are diagrams of example interactions between components of an example portion 300 of network 100. As illustrated, example network portion 300 may include television 110, STB 120, remote control 130, content server 140, and/or targeted ad insertion system 150. Television 110, STB 120, remote control 130, content server 140, and targeted ad insertion system 150 may include the features described above in connection with, for example, one or more of FIGS. 1 and 2.

A user (not shown) may utilize remote control 130 to select TV content to be provided on television 110. For example, the user may use a channel button of remote control 130 to select (e.g., via STB 120) a channel to be displayed on television 110. STB 120 may receive the user's selection, and may provide a selected TV content signal 310 to content server 140, as shown in FIG. 3A. Content server 140 may receive selected TV content signal 310, and may provide the selected TV content 320 to STB 120 (e.g., based on signal 310). STB 120 may receive TV content 320, and may provide TV content 320 to television 110. Television 110 may receive TV content 320, and may display TV content 320 (e.g., on its screen), as indicated by reference number 330. Television 110 may also display advertisements shown during the airing of TV content 320. In one example, TV content 320 may include high definition TV content.

With reference to FIG. 3B, when an advertisement is required during the airing of TV content 320, targeted ad insertion system 150 may provide a targeted ad 340, in standard definition format, to STB 120, and STB 120 may receive targeted ad 340. STB 120 may convert (or upscale) targeted ad 340 from the standard definition format to a high definition format, and may provide targeted ad 340, in the high definition format, to television 110. Television 110 may display targeted ad 340 in the high definition format, as indicated by reference number 350.

In one example implementation, firmware and an interactive media guide of STB 120 may prevent a resynchronization on television 110 when STB 120 transitions from a high definition content channel to a standard definition ad channel and vice versa. In one example, STB 120 may convert a standard definition advertisement (e.g., targeted ad 340) to a 480p, 720p, 1080p, and/or 1080i resolution so that the viewer does not experience a video impairment while television 110 renders the picture. Targeted ad insertion system 150 may provide support for display of different or the same targeted ad on both high definition and standard definition content channels during the same ad break. The high definition and standard definition content channels may not maintain synchronization and an advertisement breaks may dynamically vary.

In one example, targeted ad insertion by targeted ad insertion system 150 may experience several issues that may prevent an advertisement from been displayed on television 110 by STB 120. For example, targeted ad insertion system 150 may use ad channels that require bandwidth to be set aside for carrying advertisement video streams when any content channel enters an advertisement break. The greater the number of content channels using the ad channels for ad insertion, the greater the likelihood that such ad channels may not be available when needed by a specific content channel for ad insertion. Furthermore, STB 120 may experience problems upscaling a standard definition advertisement to the high definition format. Thus, targeted ad insertion system 150 may monitor STB 120 to validate when targeted ad 340 has been successfully or unsuccessfully displayed on television 110, in the high definition format and through the duration of targeted ad 340, as indicated by reference number 360 in FIG. 3B.

If targeted ad 340 is unsuccessfully displayed on television 110 in the high definition format, targeted ad insertion system 150 may generate error codes 370 and may provide instructions 380 to STB 120 if an error code occurs. For example, targeted ad insertion system 150 may generate a unique error code 370 if a standard definition advertisement was not upscaled to the high definition format by STB 120. If STB 120 fails to upscale a standard definition advertisement, targeted ad insertion system 150 may instruct STB 120 to prevent targeted ad 340 from being displayed and to return to (i.e., continue to display without interruption) the previously viewed TV content and/or to non-targeted ads displayed on television 110. Targeted ad insertion system 150 may generate another unique error code 370 if STB 120 fails to tune to an ad channel provided by targeted ad insertion system 150. If STB 120 fails to tune to an appropriate ad channel, targeted ad insertion system 150 may instruct STB 120 to return to (i.e., continue to display without interruption) the previously viewed TV content and/or to non-targeted ads displayed on television 110. Targeted ad insertion system 150 may generate still another unique error code 370 if STB 120 fails to locate a PID associated with a standard definition advertisement. If STB 120 fails to locate the advertisement PID, targeted ad insertion system 150 may instruct STB 120 to return to (i.e., continue to display without interruption) the previously viewed TV content to non-targeted ads displayed on television 110.

The various error codes 370 may be utilized by an operator of targeted ad insertion system 150 to determine whether targeted ad insertion system 150 and/or STBs are properly functioning. In one example implementation, targeted ad insertion system 150 may differentiate between one or more ad inserters when reporting status and errors. Alternatively, or additionally, targeted ad insertion system 150 may differentiate between one or more ad inserters from a monitoring perspective, including simple network management protocol (SNMP) reporting.

Although FIGS. 3A and 3B show example components of network portion 300, in other implementations, network portion 300 may contain fewer components, different components, differently arranged components, or additional components than depicted in FIGS. 3A and 3B. Alternatively, or additionally, one or more components of network portion 300 may perform one or more other tasks described as being performed by one or more other components of network portion 300.

FIG. 4 is a flow chart of an example process 400 for upscaling standard definition television advertisements according to implementations described herein. In one implementation, process 400 may be performed by STB 120. Alternatively, or additionally, some or all of process 400 may be performed by another device or group of devices, including or excluding STB 120.

As illustrated in FIG. 4, process 400 may include receiving TV content in a high definition format (block 410), providing the TV content for display in the high definition format (block 420), receiving an advertisement in a standard definition format (block 430), and attempting to convert the advertisement into a high definition format (block 440). For example, in an implementation described above in connection with FIGS. 3A and 3B, a user may utilize remote control 130 to select TV content to be provided on television 110. STB 120 may receive the user's selection, and may provide selected TV content signal 310 to content server 140. Content server 140 may receive selected TV content signal 310, and may provide the selected TV content 320 to STB 120 (e.g., based on signal 310). STB 120 may receive TV content 320, and may provide TV content 320 to television 110. Television 110 may receive TV content 320, and may display TV content 320 (e.g., on its screen), as indicated by reference number 330. Television 110 may also display advertisements shown during the airing of TV content 320. In one example, TV content 320 may include high definition TV content. When an advertisement is required during the airing of TV content 320, targeted ad insertion system 150 may provide targeted ad 340, in standard definition format, to STB 120, and STB 120 may receive targeted ad 340. STB 120 may attempt to convert (or upscale) targeted ad 340 from the standard definition format to a high definition format.

As further shown in FIG. 4, if the advertisement is successfully converted into the high definition format (block 440—SUCCESSFUL), process 400 may include providing the advertisement for display in the high definition format (block 450). If the advertisement is unsuccessfully converted into the high definition format (block 440—UNSUCCESSFUL), process 400 may include receiving instructions to return to the TV content based on failure to convert the advertisement to the high definition format (block 460) and providing the TV content for display in the high definition format (block 470). For example, in an implementation described above in connection with FIG. 3B, if STB 120 successfully converts target ad 340 into a high definition format, STB 120 may provide targeted ad 340 in high definition format to television 110. Television 110 may display targeted ad 340 in the high definition format, as indicated by reference number 350. If targeted ad 340 is unsuccessfully displayed on television 110, targeted ad insertion system 150 may generate error codes 370 and may provide instructions 380 to STB 120 if an error code occurs. In one example, targeted ad insertion system 150 may instruct STB 120 to return to the previously viewed TV content and/or to non-targeted advertisements displayed on television 110.

FIG. 5 is a flow chart of an example process 500 for monitoring provision of upscaled standard definition television advertisements according to implementations described herein. In one implementation, process 500 may be performed by targeted ad insertion system 150. Alternatively, or additionally, some or all of process 500 may be performed by another device or group of devices, including or excluding targeted ad insertion system 150.

As shown in FIG. 5, process 500 may include receiving a request for an advertisement from a device (e.g., STB 120) displaying TV content in a high definition format (block 510), and determining whether the device is tuned to an ad channel associated with the advertisement (block 520). For example, targeted ad insertion system 150 may receive a request for an advertisement (e.g., targeted ad 340) from STB 120, and may determine whether STB 120 is tuned to an ad channel associated with targeted ad 340.

As further shown in FIG. 5, if the device is not tuned to the ad channel associated with the advertisement (block 520—NO), process 500 may include generating an error code and instructing the device to redisplay the TV content in the high definition format (block 530). Alternatively, process block 530 may include instructing the device to return to non-targeted ads provided by television 110. For example, in an implementation described above in connection with FIG. 3B, targeted ad insertion system 150 may generate another unique error code 370 if STB 120 fails to tune to an ad channel provided by targeted ad insertion system 150. If STB 120 fails to tune to an appropriate ad channel, targeted ad insertion system 150 may instruct STB 120 to return to the previously viewed TV content and/or to non-targeted ads displayed on television 110.

Returning to FIG. 5, if the device is tuned to the ad channel associated with the advertisement (block 520—YES), process 500 may include determining whether the device is able to locate a PID of the advertisement (block 540). If the device is not able to locate the PID of the advertisement (block 540—NO), process 500 may include generating an error code and instructing the device to redisplay the TV content in the high definition format (block 550). Alternatively, process block 550 may include instructing the device to return to non-targeted ads provided by television 110. For example, in an implementation described above in connection with FIG. 3B, targeted ad insertion system 150 may generate still another unique error code 370 if STB 120 fails to locate a PID associated with a standard definition advertisement. If STB 120 fails to locate the advertisement PID, targeted ad insertion system 150 may instruct STB 120 to return to the previously viewed TV content to non-targeted ads displayed on television 110. In one example, targeted ad insertion system 150 may differentiate between one or more ad inserters when reporting status and errors. Alternatively, or additionally, targeted ad insertion system 150 may differentiate between one or more ad inserters from a monitoring perspective, including SNMP reporting.

As further shown in FIG. 5, if the device is able to locate the PID of the advertisement (block 540—YES), process 500 may include providing the advertisement, in standard definition format, to the device (block 560), and determining whether the device can convert the advertisement to a high definition format (block 570). If the device is not able to convert the advertisement to a high definition format (block 570—NO), process 500 may include generating an error code and instructing the device to redisplay the TV content in the high definition format (block 580). Alternatively, process block 580 may include instructing the device to return to non-targeted ads provided by television 110. If the device is able to convert the advertisement to a high definition format (block 570—YES), process 500 may end.

For example, in an implementation described above in connection with FIG. 3B, targeted ad insertion system 150 may monitor STB 120 to validate when targeted ad 340 has been successfully or unsuccessfully displayed on television 110, in the high definition format and through the duration of targeted ad 340, as indicated by reference number 360. If targeted ad 340 is unsuccessfully displayed on television 110 in the high definition format, targeted ad insertion system 150 may generate error codes 370 and may provide instructions 380 to STB 120 if an error code occurs. For example, targeted ad insertion system 150 may generate a unique error code 370 if a standard definition advertisement was not upscaled to the high definition format by STB 120. If STB 120 fails to upscale a standard definition advertisement, targeted ad insertion system 150 may instruct STB 120 to return to the previously viewed TV content and/or to non-targeted ads displayed on television 110.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, television content in a high definition format;
   providing, by the device, the television content for display in the high definition format;
   receiving, by the device, an advertisement in a standard definition format, where the high definition format includes a resolution higher than a resolution of the standard definition format;
   attempting, by the device, to convert the advertisement into the high definition format;
   providing, by the device, the advertisement for display in the high definition format when the advertisement is successfully converted to the high definition format; and
   receiving, by the device and following completion of the attempted conversion, instructions to continue to provide the television content, without interruption, when the advertisement is unsuccessfully converted to the high definition format.

2. The method of claim 1, further comprising:
   preventing the advertisement from being displayed when the advertisement is unsuccessfully converted to the high definition format; and
   providing the television content for display in the high definition format, without interruption, when the advertisement is unsuccessfully converted to the high definition format.

3. The method of claim 1, where the device comprises one of:
   a set-top box (STB), or
   a television.

4. The method of claim 1, where the high definition format includes one of a 480p, a 720p, a 1080p, or a 1080i resolution.

5. The method of claim 1, where the advertisement is a targeted advertisement received via an advertisement channel.

6. A device, comprising:
   a memory; and
   a processor to:
      receive television content in a first format,
      provide the television content for display in the first format,
      receive an advertisement in a second format, where the first format includes a resolution higher than a resolution of the second format,
      attempt to convert the advertisement into the first format,
      provide the advertisement for display in the first format when the advertisement is successfully converted to the first format, and
      receive, following completion of the attempted conversion, instructions to continue to provide the television content, without interruption, when the advertisement is unsuccessfully converted to the first format.

7. The device of claim 6, where the processor is further to:
   prevent the advertisement from being displayed when the advertisement is unsuccessfully converted to the first format, and
   provide the television content for display in the first format, without interruption, when the advertisement is unsuccessfully converted to the first format.

8. The device of claim 6, where the device comprises one of:
   a set-top box (STB), or
   a television.

9. The device of claim 6, where the first format includes one of a 480p, a 720p, a 1080p, or a 1080i resolution.

10. The device of claim 6, where the advertisement is a targeted advertisement received via an advertisement channel.

11. A method, comprising:
    receiving, by a device, a request for an advertisement from a set-top box (STB) displaying television content in a high definition format;
    providing, by the device and to the STB, the advertisement in a standard definition format, where the high definition format includes a resolution higher than a resolution of the standard definition format;
    determining, by the device, whether the STB failed to successfully convert the advertisement from the standard definition format to the high definition format;
    generating, by the device, a first error code when the STB failed to convert the advertisement from the standard definition format to the high definition format; and
    instructing, by the device, the STB to continue to display the television content, without interruption, in the high definition format when the STB failed to convert the advertisement from the standard definition format to the high definition format.

12. The method of claim 11, further comprising:
    determining whether the STB is tuned to an advertisement channel associated with the advertisement;
    generating a second error code when the STB is not tuned to the advertisement channel; and
    instructing the STB to continue to display the television content, without interruption, in the high definition format when the STB is not tuned to the advertisement channel.

13. The method of claim 11, further comprising:
    determining whether the STB locates a program identifier (PID) for the advertisement;
    generating a second error code when the STB fails to locate the PID for the advertisement; and
    instructing the STB to continue to display the television content, without interruption, in the high definition format when the STB fails to locate the PID for the advertisement.

14. The method of claim 11, where the high definition format includes one of a 480p, a 720p, a 1080p, or a 1080i resolution.

15. The method of claim 11, where the advertisement is a targeted advertisement.

16. A system, comprising:
    a memory; and a processor to:
- receive a request for an advertisement from a device displaying television content in a high definition format,
- provide, to the device, the advertisement in a standard definition format, where the high definition format includes a resolution higher than a resolution of the standard definition format,
- determine whether the device failed to convert the advertisement from the standard definition format to the high definition format,
- generate a first error code when the device failed to convert the advertisement from the standard definition format to the high definition format, and
- instruct the device to continue to display the television content, without interruption, in the high definition format when the device failed to convert the advertisement from the standard definition format to the high definition format.

17. The system of claim 16, where the processor is further to:
- determine whether the device is tuned to an advertisement channel associated with the advertisement,
- generate a second error code when the device is not tuned to the advertisement channel, and
- instruct the device to continue to display the television content, without interruption, in the high definition format when the device is not tuned to the advertisement channel.

18. The system of claim 17, where the processor is further to:
- determine whether the device locates a program identifier (PID) for the advertisement,
- generate a third error code when the device fails to locate the PID for the advertisement, and
- instruct the device to continue to display the television content, without interruption, in the high definition format when the device fails to locate the PID for the advertisement.

19. The system of claim 16, where the high definition format includes one of a 480p, a 720p, a 1080p, or a 1080i resolution.

20. The system of claim 16, where the advertisement is a targeted advertisement.

* * * * *